United States Patent
Zimmerer et al.

(10) Patent No.: US 9,446,574 B2
(45) Date of Patent: Sep. 20, 2016

(54) METHOD FOR BONDING PLASTICS AND METHOD FOR RELEASING A BOND IN THE PLASTIC COMPOSITE AND A PLASTIC COMPOSITE

(71) Applicant: LEIBNIZ-INSTITUT FUER POLYMERFORSCHUNG DRESDEN E.V., Dresden (DE)

(72) Inventors: Cordelia Zimmerer, Dresden (DE); Gerald Steiner, Schwarzenberg (DE); Gert Heinrich, Hannover (DE)

(73) Assignee: LEIBNIZ-INSTITUT FUER POLYMERFORSCHUNG DRESDEN E.V., Dresden (DE)

( * ) Notice: Subject to any disclaimer, the term of this patent is extended or adjusted under 35 U.S.C. 154(b) by 0 days.

(21) Appl. No.: 14/375,960

(22) PCT Filed: Jan. 29, 2013

(86) PCT No.: PCT/EP2013/051631
§ 371 (c)(1),
(2) Date: Dec. 15, 2014

(87) PCT Pub. No.: WO2013/113676
PCT Pub. Date: Aug. 8, 2013

(65) Prior Publication Data
US 2015/0111042 A1 Apr. 23, 2015

(30) Foreign Application Priority Data
Feb. 1, 2012 (DE) .................. 10 2012 201 426

(51) Int. Cl.
*B29C 65/14* (2006.01)
*B32B 38/00* (2006.01)
(Continued)

(52) U.S. Cl.
CPC ........... *B32B 38/0008* (2013.01); *B29C 65/14* (2013.01); *B29C 65/362* (2013.01);
(Continued)

(58) Field of Classification Search
CPC . B29C 65/362; B29C 65/76; B29C 65/3608; B29C 65/14; B29C 66/1122; B29C 66/30341; B29C 66/45; C08J 5/121; B32B 38/10; B32B 38/0008; B32B 37/06; B32B 27/30; B32B 27/28; B32B 27/08; B32B 43/006
See application file for complete search history.

(56) References Cited

U.S. PATENT DOCUMENTS 2,739,829 A * 3/1956 Pedlow et al. ............... 285/21.2
3,900,360 A * 8/1975 Leatherman ........ B29C 65/5021
156/272.4

(Continued)

FOREIGN PATENT DOCUMENTS

AT    AU 2882189 A    8/1989
AT    333979    8/2006

(Continued)

OTHER PUBLICATIONS

"Electromagnetic welding of plastics," Design Engineering, Dec. 1, 1985, pp. 54,55,58.

*Primary Examiner* — Daniel McNally
(74) *Attorney, Agent, or Firm* — Greenblum & Bernstein, P.L.C.

(57) ABSTRACT

The invention relates to the field of chemistry and concerns a method suitable for example for use in the automotive industry or in aircraft construction. The object of the present invention is to provide a method by which a bonding of the regions of the plastics that are in direct contact is accomplished. The object is achieved by a method for bonding plastics in which materials which contain at least one electrically conductive material and only partially cover the plastics are applied to at least one of the plastics to be bonded, then the plastics are brought into contact with one another, at least in the region with the materials, and after that at least this region is exposed at least once to an alternating electromagnetic field.

17 Claims, 1 Drawing Sheet

(51) Int. Cl.
  *B29C 65/36* (2006.01)
  *B29C 65/76* (2006.01)
  *B29C 65/00* (2006.01)
  *B32B 27/08* (2006.01)
  *B32B 27/28* (2006.01)
  *B32B 27/30* (2006.01)
  *B32B 37/06* (2006.01)
  *B32B 38/10* (2006.01)
  *B32B 43/00* (2006.01)
  *C08J 5/12* (2006.01)
  *B29K 705/14* (2006.01)
  *B29K 505/14* (2006.01)
  *B29C 65/50* (2006.01)

(52) U.S. Cl.
  CPC ........... *B29C65/3608* (2013.01); *B29C 65/76* (2013.01); *B29C 66/1122* (2013.01); *B29C 66/30341* (2013.01); *B29C 66/45* (2013.01); *B32B 27/08* (2013.01); *B32B 27/28* (2013.01); *B32B 27/30* (2013.01); *B32B 37/06* (2013.01); *B32B 38/10* (2013.01); *B32B 43/006* (2013.01); *C08J 5/121* (2013.01); *B29C 65/3628* (2013.01); *B29C 65/3676* (2013.01); *B29C 65/5057* (2013.01); *B29C 66/71* (2013.01); *B29C 66/73118* (2013.01); *B29C 66/73921* (2013.01); *B29K 2505/14* (2013.01); *B29K 2705/14* (2013.01); *B32B 2250/03* (2013.01); *B32B 2250/24* (2013.01); *B32B 2307/202* (2013.01); *C08J 2369/00* (2013.01); *C08J 2439/02* (2013.01); *Y10T 156/1158* (2015.01); *Y10T 428/31507* (2015.04)

(56) References Cited

U.S. PATENT DOCUMENTS

| | | | |
|---|---|---|---|
| 4,120,712 A | 10/1978 | Sindt | |
| 4,457,795 A | 7/1984 | Mason et al. | |
| 4,749,833 A * | 6/1988 | Novorsky | B29C 65/7802 156/272.4 |
| 5,123,989 A * | 6/1992 | Horiishi | C08J 5/124 156/272.4 |
| 5,298,713 A | 3/1994 | Marlin | |
| 5,462,314 A | 10/1995 | Goto et al. | |
| 6,921,012 B2 | 7/2005 | Jessberger et al. | |
| 7,025,842 B2 | 4/2006 | Monsheimer et al. | |
| 7,343,950 B2 | 3/2008 | Field et al. | |
| 7,964,046 B2 | 6/2011 | Neuroth et al. | |
| 2001/0004131 A1 * | 6/2001 | Masayuki | C09J 5/00 257/720 |
| 2007/0047932 A1 | 3/2007 | Caldwell et al. | |
| 2009/0301869 A1 | 12/2009 | Swalla et al. | |
| 2010/0193572 A1 | 8/2010 | Bayer et al. | |
| 2013/0149501 A1 | 6/2013 | Racchione et al. | |

FOREIGN PATENT DOCUMENTS

| | | |
|---|---|---|
| AU | 3094371 A | 1/1973 |
| CH | 702860 A1 | 9/2011 |
| DE | 802282 B | 2/1951 |
| DE | 2851612 A1 | 6/1980 |
| DE | 19636670 A1 | 3/1998 |
| DE | 69128124 T2 | 5/1998 |
| DE | 10137713 A1 | 3/2003 |
| DE | 10211875 A1 | 10/2003 |
| DE | 60207248 T2 | 8/2006 |
| DE | 112007002109 T5 | 7/2009 |
| DE | 102008038014 A1 | 2/2010 |
| DE | 102009047671 A1 | 6/2011 |
| EP | 0274641 A2 | 7/1988 |
| EP | 521755 A1 | 6/1992 |
| EP | 1346817 A1 | 9/2003 |
| EP | 1772253 B1 | 8/2011 |
| FR | 1493562 A | 7/1967 |
| FR | 2749534 | 12/1997 |
| WO | WO8304214 | 12/1983 |
| WO | WO9837353 A1 | 8/1998 |
| WO | WO 2009018804 A2 | 2/2009 |

* cited by examiner

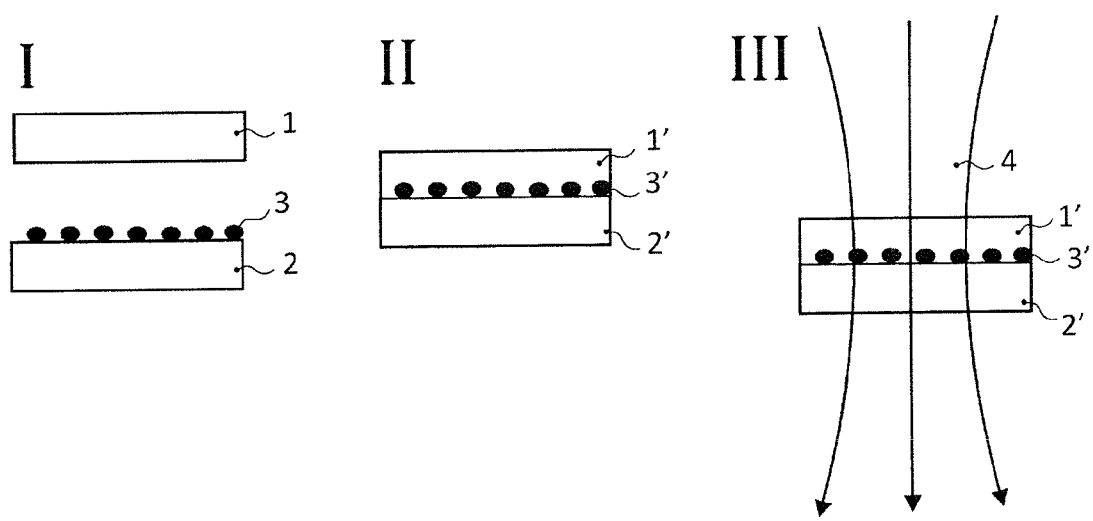

ND FOR BONDING PLASTICS AND
METHOD FOR RELEASING A BOND IN THE
PLASTIC COMPOSITE AND A PLASTIC
COMPOSITE

The disclosure relates to the field of chemistry and concerns a method for bonding plastics, as it can for example be used in diverse industrial applications, such as in the automotive industry, aircraft construction, and in the production of household objects and articles of daily use, in the packaging industry, to improve the performance characteristics of the semi-finished products or components. The disclosure also relates to a method for the release of a bond in the plastic composite, as it is required for example for safety engineering or in recycling processes.

Various technologies are known for bonding plastic surfaces. In particular, the welding of plastics is thereby of significant importance.

In principle, thermal energy must be introduced into the boundary layer between the two plastics during the welding of plastic boundary layers. Properties such as the accessibility and the geometry of the boundary layers are key criteria for the use of the specific method. In the case of the known technology of plastic welding, only thermoplastics can be used, since rheological changes (formation of molten material) in at least one of the two plastics occur as a result of the direct heating of the thermoplastics (infrared welding, welding using a heating element or heating coil) and since the welding can only be achieved thereby. After the cooling and solidification of the molten regions, a new material structure forms and leads to a typically permanent adhesion between the two plastics. The input of energy into the boundary layer that is to be joined (joining seam) is the key step for a permanent bond between the two plastics. In practice, a significant portion of the plastic is also plasticized in addition to the joining seam, or is negatively influenced in respect of the desired properties.

Depending on the field of application, different welding methods are used, such as for example laser welding, heating element welding, vibration welding or ultrasonic welding.

In the case of laser welding (DE 10 2008 038 014 A1; DE 11 2007 002 109 T5), a conductive additive, such as for example carbon black, is added to at least one of the plastic components.

The absorption of the light energy by the carbon black particles results in the heating of the surrounding plastic. This plastic component partially melts and is welded to the second plastic component.

Vibration welding generally uses solid matter friction and high pressure to produce a molten zone between the plastics (EP 1 346 817 A1; EP 1 772 253 B1; DE 10 211 875 A1; DE 60 207 248 T2). The vibration can be executed in both a linear and also an orbital manner.

In rotational welding, the necessary thermal input occurs by means of the motion of the parts being joined relative to one another. At least one of the two parts being joined must have rotational symmetry, and a high compacting pressure must be applied between the plastics (EP 110 914 A1; WO 002009018804 A2).

An additional method in the group of the frictional welding methods utilizes the molecular friction from high-frequency mechanical oscillation. It is referred to as ultrasonic welding. Oscillations are thereby transferred to the plastics, advantageously films or smaller joint faces, under pressure (AT 333 979 E; DE 69 528 314 T2).

Likewise known is hot gas welding, a further method for joining plastic parts. Here, a hot gas, usually air, is used to achieve the plastification of the plastic (AU 3 094 371 A; AU 2 882 189 A; EP 521 755 A1; CH 702 860 A1).

Also, from DE 28 51 612 A1, plastic welding and plastic liquefaction with the aid of electric current is known. For plastic welding and plastic liquefaction with the aid of electric current as a direct current flow in the plastic and in the production of a locally increased electric field, electrically conductive materials are thereby introduced or applied to the plastic to enable a flowing electric current, and locally determined dielectric losses, and therefore a heating, are produced by metal shavings introduced in a locally determined manner for the local concentration of electric field lines.

In place of the simple plastic welding wire in hot air welding, a welding wire is thereby placed in the entire weld seam, which welding wire has become electrically conductive by the introduction of electrically conductive materials, such as for example metal shavings or metal powder. An electric voltage applied to the welding wire produces an electric current in the plastic that has been made conductive, which for example has been produced by galvanizing metals onto the plastic surface. The local introduction of metal shavings to a plastic welding wire or to the weld seam produces a concentration of the electric field lines in the position of the metal shavings during dielectric welding and therefore results in locally concentrated losses and thus a targeted heating.

In this method, it is disadvantageous that, on the one hand, a direct current flow is required and an extremely precise regulation of the current flow must be achieved in order to obtain a sufficient heating, since the plastic surfaces in the weld seam must not have direct contact with one another and since thermal damage to the plastics must be largely avoided.

The aim of the present disclosure is a method for bonding plastics with which a partially direct contact of the plastics that are to be bonded is achieved and, at the same time, a bonding of these regions of the plastics is achieved, as well as the disclosure of a method for the release of a bond in the plastic composite which can be achieved in a simple manner, and furthermore in the disclosure of a plastic composite which achieves a permanent, stable bond of the plastic surfaces.

The aim is attained by the disclosure disclosed in the claims. Advantageous embodiments are the subject matter of the dependent claims.

In the method according to the invention for bonding plastics, materials are applied to at least one of the plastics which are to be bonded, which materials contain at least one electrically conductive material and only partially cover the plastics, the plastics being subsequently brought into contact with one another at least in the region with the materials, and then at least this region is exposed at least once to an alternating electromagnetic field.

Advantageously, thermoplastics, more advantageously polycarbonates or polyesters, are used as plastics.

Also advantageously, materials in a structured form are used, more advantageously in the form of closed conductor loops, in a regular or irregular form or in a meandering form, further advantageously with dimensions of 100 μm to 10 mm.

Also advantageously, spherical, ellipsoidal, rod-shaped or star-shaped particles are used, more advantageously having average diameters of 5 nm-500 nm.

And also advantageously, materials are used which are components of a film.

It is also advantageous if materials are used which are composed of a metallic material, advantageously of gold or silver.

It is likewise advantageous if materials are applied which cover maximally 50% of a plastic.

It is furthermore advantageous if the plastics in contact are exposed to a brief and strong alternating electromagnetic field.

And it is also advantageous if the plastics in contact are exposed to an alternating electromagnetic field which comprises field intensities in one pulse or in multiple pulses briefly occurring one after the other or in another chronologically variable form.

It is also advantageous if the plastics in contact are exposed to an alternating electromagnetic field of at least 30 T, more advantageously within 1 µs to 10 ms.

It is likewise advantageous if the surfaces in contact are exposed to an alternating electromagnetic field with higher field strength within a shorter period, or to an alternating electromagnetic field with lower field strength in multiple pulses within an equal period.

Furthermore, for the method according to the invention for the release of a bond in the plastic composite, materials are applied to at least one of the plastics to be bonded, which materials contain at least one electrically conductive material and only partially cover the plastics, the plastics being subsequently brought into contact with one another at least in the region with the materials, and then at least this region is exposed at least once to an alternating electromagnetic field, and this region is exposed at least once to an alternating electromagnetic field to release this bond, wherein the region is exposed to an alternating electromagnetic field either having a higher field strength than has been used for the bonding or with an equal strength and equal period but a greater number of pulses than has been used for the bonding.

The plastic bond according to the invention is composed of at least two plastics which are connected to one another in at least a materially bonded manner and are at most partially connected to one another in the region of their bond in at least a materially bonded manner, wherein materials are present in the region of their bond which contain at least one electrically conductive material.

Advantageously, the materially bonded connection occurs via a chemical reaction.

With the present disclosure, a method is disclosed for the first time in which a partial direct contact of the plastics that are to be bonded is achieved and a bonding of these regions of the plastics is achieved at the same time. Also with the present disclosure, a method for the release of a bond in the plastic composite is disclosed for the first time with which the release of the bond can be achieved in a simple and residue-free manner. Furthermore, from the solution according to the disclosure, a plastic composite in which a permanent, stable bond of the plastic surfaces is achieved is known for the first time.

This is attained in that materials are applied to at least one of the plastics that are to be bonded, which materials contain an electrically conductive material and only partially cover the plastics. The plastics are subsequently brought into contact with one another at least in the region of the materials, and at least this region is exposed one time or multiple times to an alternating electromagnetic field.

As plastics, those which are neither electrically nor thermally conductive are used according to the invention. Advantageously, thermoplastics and plastics which also contain functional coupling groups are suitable for the solution according to the invention. Advantageously, polycarbonates or polyesters can be used.

As materials, those which contain at least one electrically conductive material are used. Advantageously, this can be a metallic material.

These materials can be present and/or applied in an unstructured or structured form.

Materials in an unstructured form can, for example, be particles which are spherical, ellipsoidal, rod-shaped or star-shaped and which advantageously have an average diameter of 5 nm-500 nm. Unstructured particles of this type can then be applied to the plastics in a structured form.

Furthermore, however, materials can also be applied to the plastics in a structured form, for example in the form of closed conductor loops, in a regular or irregular form or in a meandering form, further advantageously having dimensions of 100 µm to 10 mm. The average diameter of the materials could advantageously lie within the range of the roughness of the plastics that are to be bonded.

The materials can also be a component of a film that is applied to a plastic. The distribution and arrangement or orientation of the structures of the materials on the plastics can thus be better controlled.

In each case, the materials only partially cover the plastics so that the regions of the plastics located therebetween can be bonded to one another. Advantageously, the coverage is maximally 50% of the respective plastics.

The plastics are subsequently brought into contact at least where the materials are located, and then at least this region is exposed to an alternating electromagnetic field at least once, but also multiple times.

Advantageously, this region is exposed to a brief (1 µs-10 µs) and strong (60 T-100 T) alternating electromagnetic field.

It is also possible according to the invention if the entirety of the plastics that are to be bonded is exposed to the alternating electromagnetic field.

The field strength of the alternating electromagnetic field can thereby be applied in one pulse or in multiple pluses occurring shortly one after the other, or in another chronologically variable form.

Advantageously, the plastics in contact are exposed to an alternating electromagnetic field in which the change in the magnetic field strength is advantageously between 1 T/ms and 40 T/ms.

According to the disclosure, it is furthermore advantageous if the plastics in contact are exposed to the change in the electromagnetic field with higher field strength within a longer period or to the change in the electromagnetic field with lower field strength in a shorter period. Furthermore, it is also advantageous to expose the plastics in contact for a longer period to a periodically variable electromagnetic field with a lower change in the field strength.

The aim is furthermore attained by a method for the release of a plastic bond. It is thereby of critical importance that the bond has been achieved according to the above-mentioned method for the bonding of plastics. A bond of this type can then be released by the method according to the disclosure for the release of a plastic bond.

This is achieved according to the disclosure in that at least the region of the bonded plastics is exposed to an alternating electromagnetic field which comprises has been used either with a higher field strength than has been used for the production of the bond or with an equal field strength of a shorter period than was used for the production of the bond.

It is particularly advantageous that the bond released in such a manner can be reproduced by a renewed application of materials and renewed application of an electromagnetic field.

The resulting plastic composite according to the invention is composed of at least two plastics which are connected to one another in at least a materially bonded manner and are at most partially connected to one another in the region of their bond. In the region of the bond, the composite comprises materials which contain at least one electrically conductive material. Advantageously, the materially bonded connection occurs via a chemical reaction of the plastics with one another.

Normally, two or more polymers cannot be bonded to one another. A chemical reaction and the thereby possible formation of covalent bonds is only possible with the presence of functional coupling groups and after attaining the activation energy. Typically, the activation energy can only be attained by supplying heat. Because polymers are fundamentally poor thermal conductors, considerable energy must be applied to achieve the required temperature at the mostly inaccessible polymer/polymer boundary layer. This very often leads to a thermal destruction of the polymer material so that the thermally induced reaction between polymers is not possible in this way.

With the solution according to the disclosure, thermal energy is only introduced specifically in the region of the plastic/plastic boundary layer, without a destruction of or thermal stress to the plastic resulting thereby.

The coupling of the required activation energy thereby occurs via an alternating electromagnetic field, by which plasmon oscillations and/or eddy currents can be induced into the material which contains at least one electrically conductive material, and not at all through direct application of an electric current to the material which contains at least one electrically conductive material. The material is applied to at least one plastic before the joining of the at least two plastics and is thus located in the plastic/plastic boundary layer after the joining of the plastics. As a result of the electrical resistance, the one-time introduction of plasmon oscillation or eddy currents leads to a locally confined brief heating. If the activation energy of the plastics is reached, chemical reactions and the formation of covalent bonds between the plastics occur.

No thermal changes occur in the remaining plastic material. Provided that no covalent couplings occur as a result of the chemical bonds, the bonding of the plastic surfaces occurs through physical interactions according to the disclosure.

With the solution according to the disclosure, the energy input can be achieved only in the plastic boundary layer, and an energetic, in particular thermal, stress to the plastic volume does not occur.

The advantages of the solution according to the disclosure are:
  low thermally induced warping,
  targeted energy input into the plastic/plastic boundary layer,
  short exposure time to the alternating electromagnetic field,
  quasi-simultaneous welding,
  plastic thickness of inner boundary layers does not have a limiting effect, since the alternating electromagnetic field does not interact with the plastics
  ambient atmosphere can be freely selected,
  uncomplicated production and sequence of the reaction,
  very large working distance possible,
  method can be varied within a wide range and set for the individual plastics by adjustments of the magnetic field, such as strength, pulse length, pulse repetition rate, and the design of the material, such as material, size, shape,
  no additional chemical additives or catalysts necessary,
  no limitation in the geometry of the bonding region and of the boundary layer, such as in size, shape,
  stable, permanent composite bond—not only due to physical effects, but precisely also as a result of the formation of covalent bonds in the boundary layer,
  chemical reactions via a plastic/plastic boundary layer without reactive effect on the polymer materials,
  production of new polymer composites with new properties.

Unlike the known welding methods for plastics, the solution according to the disclosure is aimed, on the one hand, at a stable, permanent composite formation. The method can be applied very flexibly to various plastic systems. Thermal shrinkage of the polymer materials during the cooling does not occur. Because the method according to the disclosure operates in a quasi-simultaneous manner, it exhibits very short joining times and also has a free selection of the joining seam geometries. At the same time, however, a bond and a release of this bond can also be achieved according to the invention by varying the exposure to the electromagnetic field and, at the same time, this procedure can be reproduced multiple times in succession.

The present disclosure is explained in greater detail with the aid of an exemplary embodiment.

Wherein:

FIG. 1 shows the schematic illustration in cross section of the bond formation according to the invention.

Diagram 1 shows an exemplary reaction for the chemical bond formation between polycarbonate and polyvinylamine Diagram 2 shows an exemplary reaction for the release of the chemically coupled bond between polycarbonate and polyvinylamine

EXAMPLE 1

A sample plastic molded body of bisphenol A-based polycarbonate (PC) with the dimensions 1 cm×1 cm is to be bound to a plastic molded body of polyvinylamine (PVAm) functionalized with amino groups and having the dimensions 1 cm×1 cm. The glass transition temperature of the polycarbonate (PC) is approximately 145° C. and approximately 130° C. for the polyvinylamine (PVAm).

A ring of gold having the following dimensions: 5 mm outer diameter and 1 mm ring gauge, 150 nm ring thickness is applied to the PC plastic molded body. In this manner, an approximately 10% degree of coverage of the plastic is achieved.

The plastic molded bodies of PC and PVAm are then brought into contact with one another in the region on which the ring is located, and the two bodies are exposed to an electromagnetic pulse of 60 T for 7 ms.

The coupling reaction triggered after the input of the activation energy occurs as illustrated below:

Diagram 1

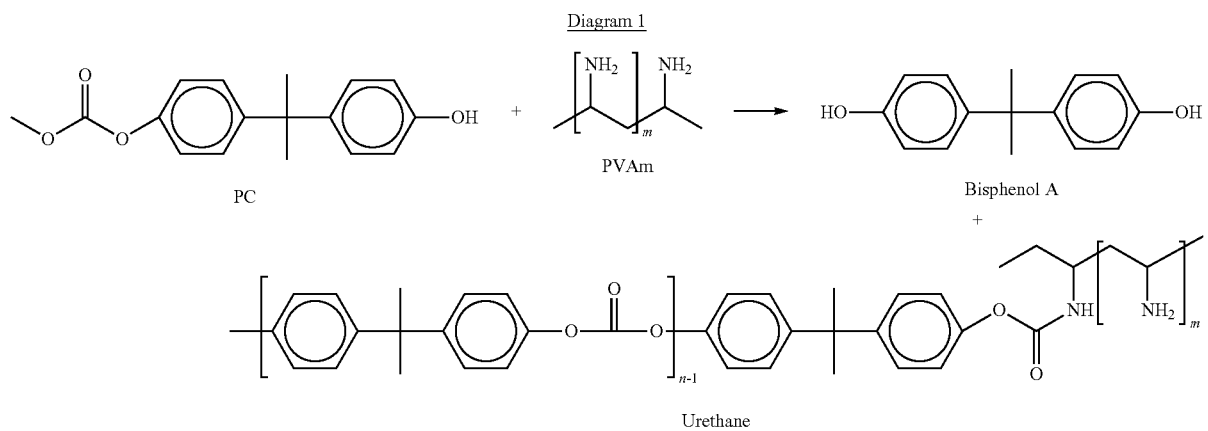

The resulting composite of PC and PVAm includes the unchanged ring in the boundary layer, and a covalent bond of the two plastics is achieved in the regions of the direct contact by the chemical reaction. The composite is stably bonded and permanent.

The release of this chemically coupled plastic bond occurs with a renewed exposure to the alternating electromagnetic field twice at 10 T/ms respectively. The breaking of chemical bonds inside the boundary layer of the plastic composite thereby occurs. The separation of both plastic molded parts occurs immediately during or shortly after the energy input in the heated state.

Diagram 2

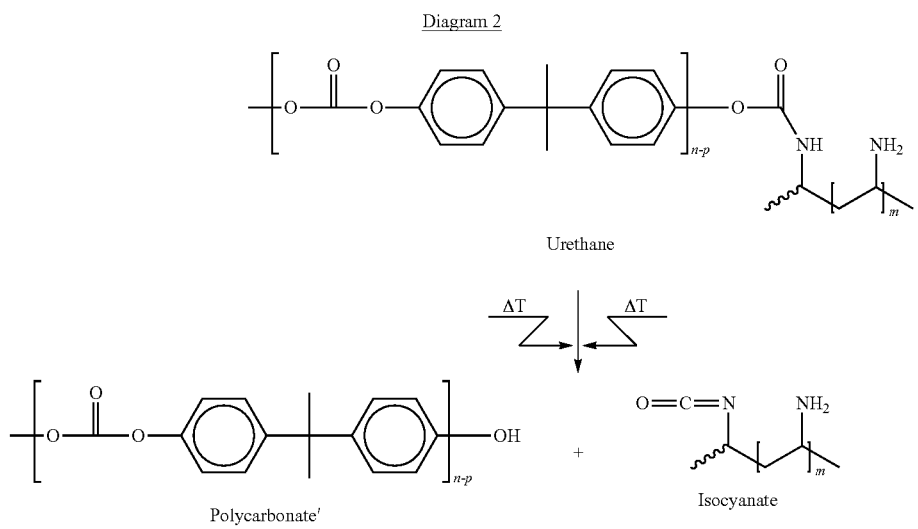

LIST OF REFERENCE NUMERALS

1 plastic 1
2 plastic 2
1' assembled with plastic 2
2' assembled with plastic 1
3 material on the surface
3' material in the boundary layer
4 alternating electromagnetic field
I plastics before bonding
II assembled, but not yet bonded plastics
III effect of an alternating electromagnetic field

What is claimed is:

1. Method for bonding two layers of plastics to one another, the method comprising:
    applying materials to at least one of the two layers of plastics that are to be bonded, which materials only contain at least one electrically conductive material and which only partially cover the at least one of the plastics,
    subsequently bringing the two layers of plastics into direct physical contact with one another at least in a region with the materials, and
    exposing at least the region at least once to an alternating electromagnetic field to bond two layers of plastics to one another via a chemical bond.

2. Method according to claim 1, in which materials in a structured form are used in a regular or irregular form or in a meandering form.

3. Method according to claim 2, in which the structured form is a closed conductor loop.

4. Method according to claim 2, in which the dimensions of the structured form are from 100 μm to 10 mm.

5. Method according to claim 1, in which thermoplastics are used as plastics.

6. Method according to claim 5, in which polycarbonates or polyesters are used as plastics.

7. Method according to claim 1, in which spherical, ellipsoidal, rod-shaped or star-shaped particles are used as material.

8. Method according to claim 7, wherein the particles have an average diameter of 5 nm-500 nm.

9. Method according to claim 1, in which materials are used which are composed of a metallic material.

10. Method according to claim 9, wherein the metallic material comprises gold or silver.

11. Method according to claim 1, in which the plastics in contact are exposed to an alternating electromagnetic field of at least 30 T.

12. Method according to claim 11, in which the plastics in contact are exposed to an alternating electromagnetic field within 1 μs to 10 ms.

13. Method according to claim 1, in which materials are used that are components of a film.

14. Method according to claim 1, in which materials are applied which cover maximally 50% of a plastic.

15. Method according to claim 1, in which the plastics in contact are exposed to a brief and strong alternating electromagnetic field.

16. Method according to claim 1, in which the plastics in contact are exposed to an alternating electromagnetic field comprising field intensities in one pulse or in multiple pulses occurring shortly one after the other or in another chronologically variable form.

17. Method according to claim 1, in which the surfaces in contact are exposed to an alternating electromagnetic field with a higher field strength within a shorter period or to an alternating electromagnetic field with lower field strength in multiple pulses within the same period.

* * * * *